United States Patent [19]

Allport

[11] Patent Number: 5,003,726

[45] Date of Patent: Apr. 2, 1991

[54] METHOD FOR PROTECTING DRIP IRRIGATION HOSES AND OTHER STRUCTURES FROM ROOT INTRUSION

[75] Inventor: Davies Allport, La Jolla, Calif.

[73] Assignee: T-Systems Corp., San Diego, Calif.

[21] Appl. No.: 511,971

[22] Filed: Apr. 17, 1990

Related U.S. Application Data

[63] Continuation of Ser. No. 313,588, Feb. 21, 1989, abandoned.

[51] Int. Cl.⁵ .............................................. C05G 3/04
[52] U.S. Cl. ...................................................... 47/48.5
[58] Field of Search ................... 47/48.5, 58, DIG. 10

[56] References Cited

U.S. PATENT DOCUMENTS 2,653,449  9/1953  Stauch ................................. 47/48.5
3,946,762  3/1976  Green .................................. 47/48.5

OTHER PUBLICATIONS

Farm Industry News (Midwest Ed.), Nov., 1987, vol. 20, No. 10, p. 25; Dialog AgriBusiness U.S.A.

Primary Examiner—David A. Scherbel
Assistant Examiner—Michele A. Van Patten
Attorney, Agent, or Firm—Christie, Parker & Hale

[57] ABSTRACT

In a method for prohibiting the growth of roots in the outlets of a drip irrigation hose, water under pressure is supplied to the hose for drip irrigation of the soil. A soil retainable, water transportable substance such as clay is introduced into the hose upstream of the outlets to form in the vicinity of the outlets localized regions containing the substance. The soil-retaining substance is also capable of absorbing a selected root-inhibiting, water-transportable substance. The selected root-inhibiting substance is introduced into the hose upstream of the outlets to distribute such root-inhibiting substance to the localized regions for absorption by the soil-retainable substance.

6 Claims, No Drawings

METHOD FOR PROTECTING DRIP IRRIGATION HOSES AND OTHER STRUCTURES FROM ROOT INTRUSION

This is a continuation of Ser. No. 313,588, filed Feb. 21, 1989, now abandoned.

BACKGROUND OF THE INVENTION

Drip irrigation hoses are in common use today. They are usually light, flexible plastic tubes with outlets, called emitters, located along them. These emitters allow water to slowly escape into the ground in order to irrigate the crop. Often fertilizers and other chemicals are added to the water for the benefit of the plants. These hoses are usually installed slightly underground to protect them from wind, rodents, sun, and machinery and to aid the flow of the water into the soil.

One of the problems of such a drip irrigation installation is that, if the grower does not irrigate enough to satisfy the needs of the plant, roots will grow to find more water. As the hose usually has some residual water left in it, the roots will seek the water, entering the emitter and eventually plugging it. When this process starts, uniformity of water distribution becomes erratic and shortly, unsatisfactory crop response results.

Root inhibiting chemicals may be passed through the hoses so as to destroy the roots of unwanted plants, but when the crop has been planted, the chemicals will also attack the crop.

SUMMARY OF THE INVENTION

This invention eliminates this problem by conveying through the drip irrigation hose a substance that when emitted into the soil will be retained by the soil particles in the proximity of the emitter. Additionally, the substance has an affinity for a root inhibiting chemical. When the substance and the chemical come in contact with each other the chemical is readily absorbed by the substance. The substance is then considered to be "dosed" with the chemical. Once dosed, the root inhibiting chemical is slowly released from the substance as a gas, thus protecting the emitter from root intrusion. The protection continues as long as the root inhibiting chemical is released at a sufficient rate. After that time, the substance can be re-dosed by passing additional root inhibiting chemical through the hose. This process can be repeated as often as needed.

This technology can also be used for other liquid storage and conveying systems or for other structures which are in contact with the soil and are subject to root intrusion. The substance to be dosed can be injected by a liquid carrier or can be deposited in many other ways such as pressure injection into holes, cracks and crevices. The dosing can be applied whenever required by the same means. In any case, the substance serves to localize or focus the distribution of the root inhibiting chemical and thus to localize the herbicidal effect where root intrusion is to be eliminated.

DETAILED DESCRIPTION OF THE INVENTION

This invention relates to drip irrigation hoses as well as to liquid conveying or storage devices and other structures that are, at least in part, on top of or in the ground where unwanted roots from the soil may enter any cracks, crevices, or holes in the hose, structure or device. The invention uses the same paths the roots may take to enter the device to convey a fluid or fine particle slurry substance through the paths of the device so as to enter into the soil and be retained by the soil in the vicinity of the outlets of these paths. Furthermore, these same paths are used to pass into the area of the soil retained substance a root inhibiting chemical that has an affinity for the previously injected substance and is absorbed (dosed) by it. After dosing, the substance will then release the chemical at a slow controlled rate to inhibit the intrusion of roots. As the depletion of the inhibitor continues to an ineffective level, re-dosing of the substance is easily accomplished by passing additional root inhibiting chemical through the same openings that were used to inject the original dose of chemical.

To properly implement this method of protecting the emitters of a drip irrigation hose from root intrusion without damaging the adjacent roots of the crop, the substance to be dosed must be able to stay in suspension with the irrigation water until it is injected into the soil. Furthermore the amount to be injected must be controlled for the amount that is emitted by each emitter determines the size of the soil area around each emitter outlet that can be dosed with the root inhibiting chemical and therefore the area that will be devoid of roots. If the crop is of small plants with a small root area, crop damage can occur if the root inhibiting chemical encroaches into this area.

Any type of drip irrigation hose can be used to practice the invention--for example, a film with flow regulating passages formed by overlapping margins and adhesive beads (U.S. Pat. No. 4,247,051), an extruded hose (U.S. Pat. No. 3,903,929), a hose with separately formed emitters (U.S. Pat. No. 4,037,791), or multi-component hoses (U.S. Pat. No. 3,777,987).

Other considerations are that the amount of the dosed substance injected around each emitter and its capacity for the root inhibitor determines the frequency of re-dosing. Furthermore, the amount of root inhibitor that is applied during each dosing should be slightly less than the capacity of the substance to absorb it so that the crop does not suffer from an overdose of inhibitor.

Using clay for the substance to be injected through the drip irrigation hose is practical because it has the capacity to cling to soil particles without being easily washed away with subsequent irrigation. Furthermore, it has an affinity for a root inhibitor and satisfies the slow release requirement. It is also environmentally acceptable, low in cost and may be handled in most drip irrigation systems with little or no additional equipment or cost. Other materials may be used such as polyethylene granules which possess the same requirements but at a higher cost and with more difficulty.

A well known root inhibitor, trifluralin, sold by Elanco Products Company, a division of Eli-Lilly and Company, under the trademark TREFLAN, satisfies the requirements for this method. It is easily deployed in drip irrigation systems, has an affinity to combine with clays and dissipates into the soil at a slow predictable rate.

The same method of conveying a root inhibitor and absorbing substance with a fluid flowing through pipe lines, hoses, sewer lines, septic tanks and the like, so as to chemically treat any potential root intrusion through the cracks, holes and other voids, can be used. Re-dosing of the substance also may be achieved.

Treatment of other structures such as roads, walk ways, foundations and other structures may be protected from root growth through cracks, crevices, holes or voids by injecting a substance that may be dosed with a root inhibitor, as well as the root inhibitor, into those voids by pressure application, capillary action, spraying, squeegee or other means.

What is claimed is:

1. A method of prohibiting the growth of roots into the outlets of a drip irrigation hose having distributed outlets in proximity to planted soil, the method comprising the steps of:

supplying water under pressure to the hose for drip irrigation of the soil;

introducing into the hose upstream of the outlets a soil retainable, water transportable substance to form in the vicinity of the outlets localized regions containing the substance, the soil retainable substance also being capable of absorbing a selected root inhibiting water transportable substance; and introducing into the hose upstream of the outlets the selected root inhibiting substance to distribute such root inhibiting substance to the localized regions for absorption by the soil retainable substance.

2. The method of claim 1 in which the soil retainable substance is capable of forming a suspension in the water.

3. The method of claim 2 in which the soil retainable substance is clay.

4. The method of claim 1 in which the root inhibiting substance is a water soluble liquid that is released gradually from the soil retainable substance as a gas.

5. The method of claim 4 in which the root inhibiting substance is trifluralin.

6. The method of inhibiting root intrusion into a fluid carrying system having at least one inlet, the method comprising the steps of:

supplying fluid under pressure to the inlet;

introducing into the inlet a soil retainable, fluid transportable substance to form in the vicinity of any fluid exits from the system localized regions containing the substance, the soil retaining substance also being capable of absorbing a selected root inhibiting fluid transportable substance; and introducing into the inlet the selected root inhibiting substance to distribute such root inhibiting substance to the localized regions for absorption by the soil retainable substance.

* * * * *